United States Patent
Sayyed et al.

(10) Patent No.: US 12,117,912 B2
(45) Date of Patent: Oct. 15, 2024

(54) ENRICHED PRE-EXTENSIBLE FIRMWARE INTERFACE INITIALIZATION GRAPHICS

(71) Applicant: Dell Products L.P., Round Rock, TX (US)

(72) Inventors: Ibrahim Sayyed, Georgetown, TX (US); Frank Quintanilla, Cedar Park, TX (US); Adolfo S. Montero, Pflugerville, TX (US); Jagadish Babu Jonnada, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 17/708,280

(22) Filed: Mar. 30, 2022

(65) Prior Publication Data

US 2023/0315595 A1  Oct. 5, 2023

(51) Int. Cl.
*G06F 11/22* (2006.01)
*G06F 9/4401* (2018.01)

(52) U.S. Cl.
CPC ........ *G06F 11/2221* (2013.01); *G06F 9/4401* (2013.01); *G06F 11/2284* (2013.01)

(58) Field of Classification Search
CPC .. G06F 11/2221; G06F 11/2284; G06F 11/32; G06F 11/321; G06F 11/324; G06F 11/327; G06F 11/328; G06F 9/4401
See application file for complete search history.

(56) References Cited

U.S. PATENT DOCUMENTS

| | | | |
|---|---|---|---|
| 6,629,240 B1 * | 9/2003 | Lee | G06F 9/4403 713/1 |
| 10,152,432 B1 * | 12/2018 | Dasar | G06F 13/102 |
| 11,157,349 B2 | 10/2021 | Shah et al. | |
| 11,231,940 B2 | 1/2022 | Bhuiyan et al. | |
| 2006/0031716 A1 * | 2/2006 | Chen | G06F 11/2284 714/36 |
| 2006/0095224 A1 * | 5/2006 | Lambert | G06F 11/2284 702/57 |
| 2006/0174240 A1 * | 8/2006 | Flynn | G06F 21/575 717/170 |
| 2006/0236087 A1 * | 10/2006 | Ha | G06F 11/2284 714/E11.149 |
| 2007/0168763 A1 * | 7/2007 | Sauber | G06F 11/327 714/E11.187 |
| 2011/0047365 A1 | 2/2011 | Hentosh et al. | |
| 2013/0017717 A1 * | 1/2013 | Cao | G06F 11/2284 439/517 |
| 2013/0159770 A1 * | 6/2013 | Gao | G06F 11/2284 714/27 |
| 2020/0073773 A1 * | 3/2020 | Liu | G06F 9/4406 |
| 2020/0301796 A1 * | 9/2020 | Hu | G06F 13/4282 |
| 2021/0117205 A1 | 4/2021 | Bhuiyan et al. | |
| 2021/0240561 A1 | 8/2021 | Shah et al. | |

* cited by examiner

Primary Examiner — Gabriel Chu
(74) Attorney, Agent, or Firm — Larson Newman, LLP (57) ABSTRACT

An information handling system includes an embedded controller configured to transmit an error code to a pre-extensible firmware interface initialization module. A graphics font manager may generate a glyphs database during a boot process. If the error code is associated with a no power-on self-test, no video condition, then the pre-extensible firmware interface initialization module may retrieve information associated with the error code transmitted by the embedded controller, and locate the glyphs database generated by the graphics font manager from the non-volatile storage device.

20 Claims, 6 Drawing Sheets

ENRICHED PRE-EXTENSIBLE FIRMWARE INTERFACE INITIALIZATION GRAPHICS

FIELD OF THE DISCLOSURE

The present disclosure generally relates to information handling systems, and more particularly relates to enriched pre-extensible firmware interface initialization graphics.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes an embedded controller configured to transmit an error code to a pre-extensible firmware interface initialization module. A graphics font manager may generate a glyphs database during a boot process. If the error code is associated with a no power-on self-test, no video condition, then the pre-extensible firmware interface initialization module may retrieve information associated with the error code transmitted by the embedded controller, and locate the glyphs database generated by the graphics font manager from the non-volatile storage device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
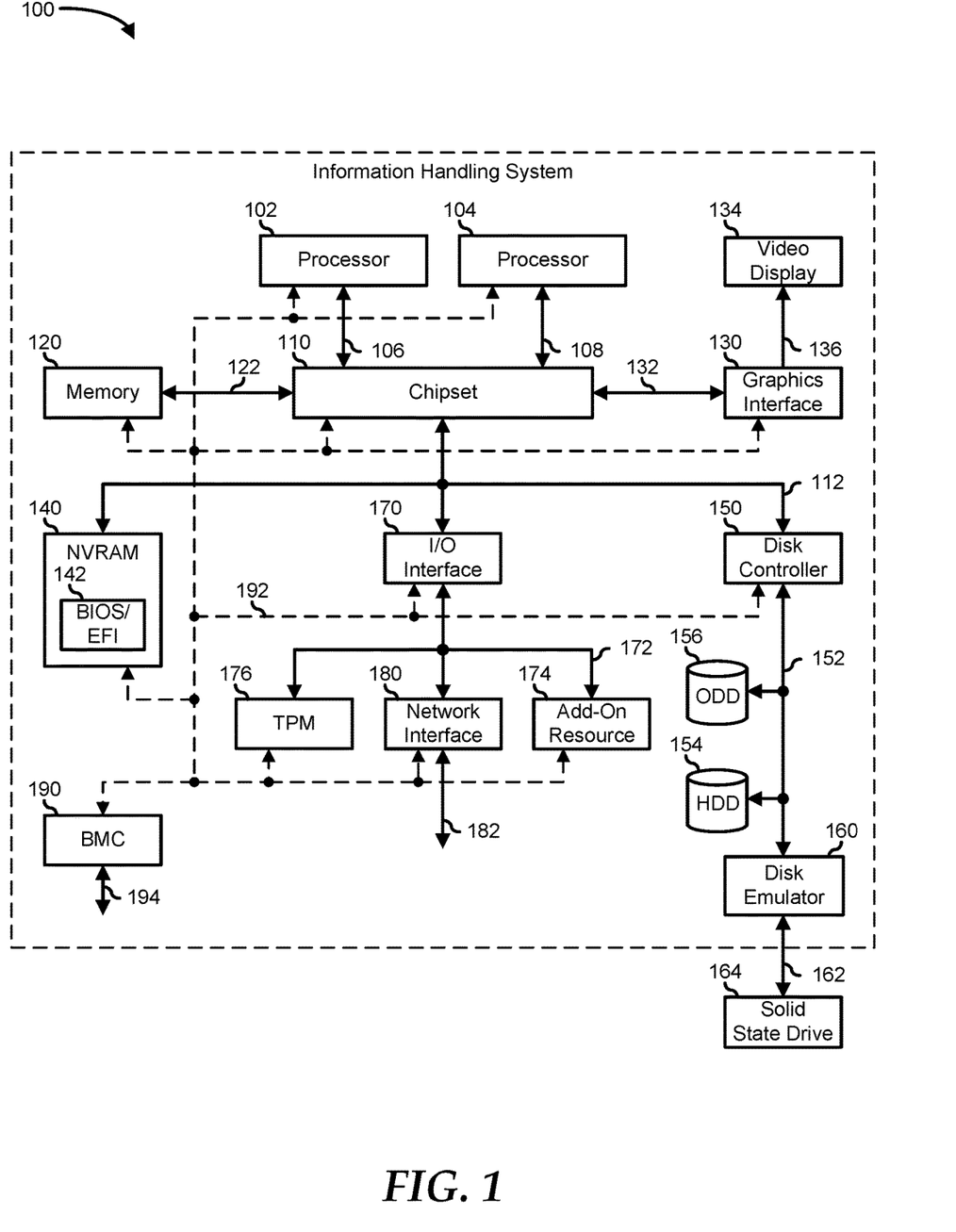
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface, a Universal Serial Bus (USB), another interface, or a combination thereof. NV-RAM 140 includes BIOS/EFI module 142 that stores machine-executable BIOS/EFI code that operates to detect the resources of information handling system 100, to provide drivers for the resources, to initialize the resources, and to provide common access mechanisms for the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

In some circumstances, an information handling system may fail a power-on self-test (POST) and have no video output, also referred to herein as a "no POST, no video" (NP-NV) scenario or condition. At this point, a light-emitting diode (LED) and/or a power button LED may blink according to a diagnostic blink pattern. In addition, the user may hear beep codes from the information handling system while the display monitor is blank. The diagnostic blink pattern and/or beep codes may frustrate the user who cannot see anything on a display monitor, such as video display 134. Thus, there is a need to improve this user experience. The present disclosure provides a technical improvement in that an end-user of an information handling system may be able to view information associated with the NP-NV condition instead of just the diagnostic blink pattern and/or beep codes. In particular, the present disclosure may provide the information via BIOS access to a video frame buffer at the early stages of the boot process and display information on the display screen that can be used by the user and/or a technical support representative to triage the issue and perform remediation action.

Figure 2:
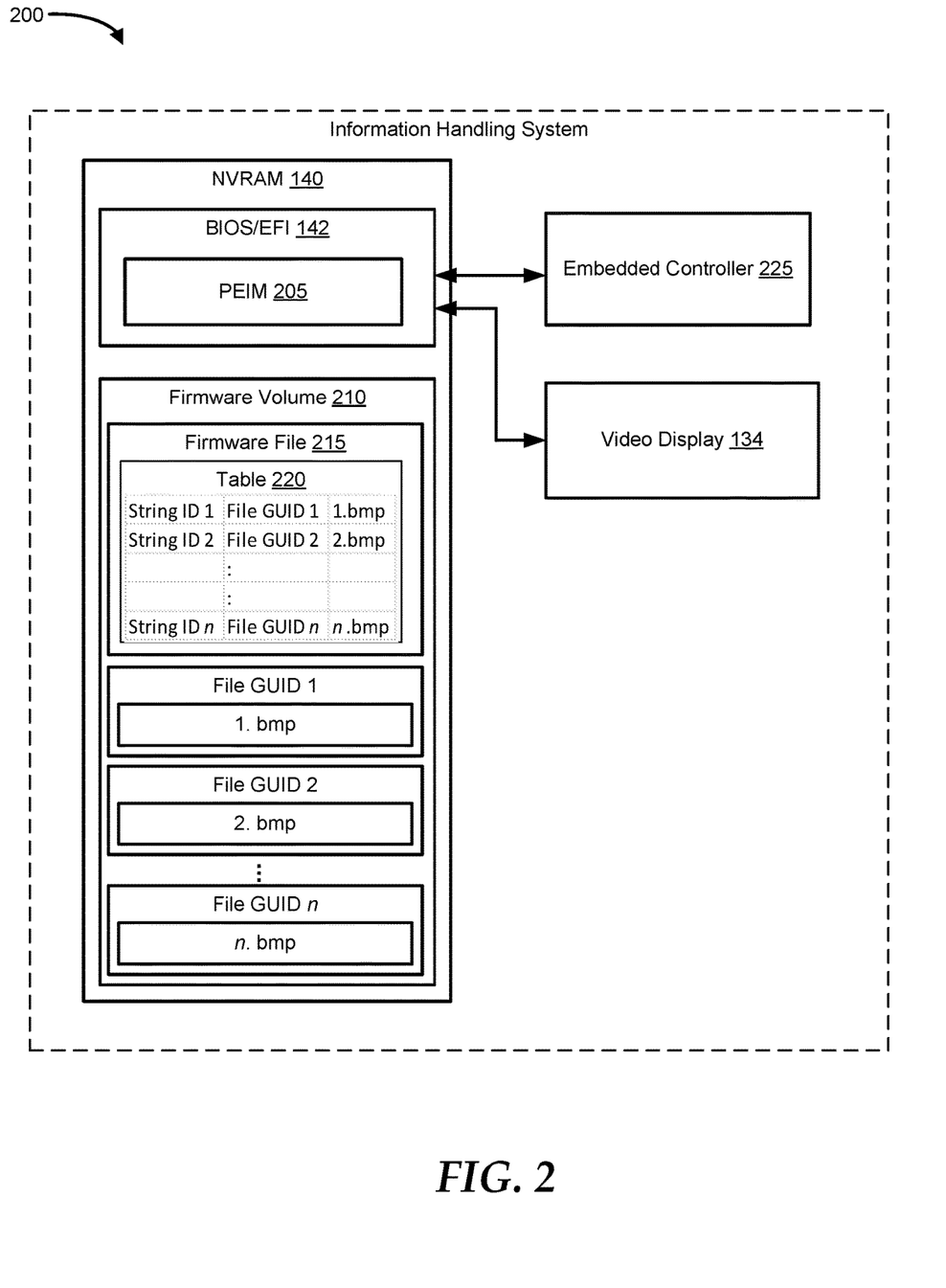
FIG. 2 is a block diagram illustrating an information handling system for enriched pre-extensible firmware interface initialization graphics, according to an embodiment of the present disclosure.

FIG. 2 shows an information handling system 200 for enriched pre-extensible firmware interface initialization graphics. Information handling system 200, which is similar to information handling system 100 of FIG. 1, includes video display 134, NVRAM 140, and an embedded controller 225 that is similar to BMC 190. NVRAM 140 includes BIOS/EFI 142 and a firmware volume 210. BIOS/EFI 142 includes a pre-EFI initialization module (PEIM) 205. For purposes of this disclosure, EFI and UEFI are used interchangeably and called UEFI for simplicity. Also as used herein, legacy BIOS, as well as UEFI BIOS, are referred to as BIOS for simplicity. Although BIOS/EFI 142 and firmware volume 210 both are shown to be stored in NVRAM 140, firmware volume 210 may be stored in a memory device external to BIOS/EFI 142.

The components of information handling system 200 may be implemented in hardware, software, firmware, or any combination thereof. The components shown are not drawn to scale and information handling system 200 may include additional or fewer components. In various embodiments, information handling system 200 may not include each of the components shown in FIG. 2. Additionally, or alternatively, information handling system 200 may include various additional components in addition to those that are shown in FIG. 2. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip. In addition, connections between components may be omitted for descriptive clarity.

NVRAM 140 may be a non-volatile storage device, such as an SPI flash memory device. NVRAM 140 includes one or more firmware volumes, such as firmware volume 210. A firmware volume is a file-level interface to firmware storage such as an SPI flash memory device or other non-volatile storage. For example, the firmware storage may be in an SPI partition or an EFI system partition of NVRAM 140. Each firmware volume may include one or more firmware files. For example, firmware volume 210 includes a firmware file 215 and firmware files "file GUID 1," "file GUID 2," through "file GUID n."

In one embodiment, BIOS/EFI 142 can include a plurality of PEI modules (PEIMs), such as PEIM 205. A PEIM can be configured to perform a function during the PEI phase of the boot process, such as initializing a component of information handling system 200 or changing a system setting. PEIM 205 may be configured to render one or more image files at video display 134 via a graphics output protocol. The PEIM may be configured to render a string to an image on a display screen using a specified font, color, and one or more other options. The image file is associated with an error code received from embedded controller 225 when the information handling system encountered an NP-NV condition during the boot process. The image file may include a guided resolution to resolve the NP-NV condition.

When information handling system 200 is in a recovery state with an NP-NV condition, embedded controller 225 may send or report information associated with the NP-NV condition to PEIM 205. For example, embedded controller 225 may send or report an error code, error string, or identifier associated with the error code or error string. In one embodiment, PEIM 205 may be configured to determine the identifier associated with the error code or error string received from embedded controller 225. PEIM 205 may use the error code, error string, or identifier to locate a firmware file and/or an image file.

For example, PEIM 205 may use a table 220 to represent mappings associated with NP-NV conditions. Each error code or error string may be associated with an identifier that is mapped to a firmware file, and/or an image file. The firmware file may be associated with a globally unique identifier (GUID). For example, as shown in table 220, "string ID 1" is mapped to file GUID 1 and 1.bmp, wherein string ID 1 is the identifier of a particular error code or error string. The string ID 1 is associated with file GUID 1 which includes 1.bmp. The image file may include information associated with the NP-NV condition, such as an error name, error code, service tag, device identifier, and a step(s) to resolve the issue associated with the NP-NV condition. Although the mapping of the identifier, firmware file GUID, and the image is shown as a table, a person with ordinary skill in the art may implement the mapping using a database, a data array, an array of pointers, or the like.

PEIM 205 may use the UEFI graphics output protocol to render the image file on display device 134 during the NP-NV condition. In particular, PEIM 205 may transmit the image file to a video frame buffer or simply frame buffer which may have been established when the graphics output protocol was initialized. The image file may include information associated with the NP-NV condition. The image file may also include a logo associated with the original equipment manufacturer (OEM) of information handling system 200. In another embodiment, the image may include information regarding mitigation steps that can be displayed during the recovery of the information handling system from the NP-NV condition.

Figure 3:
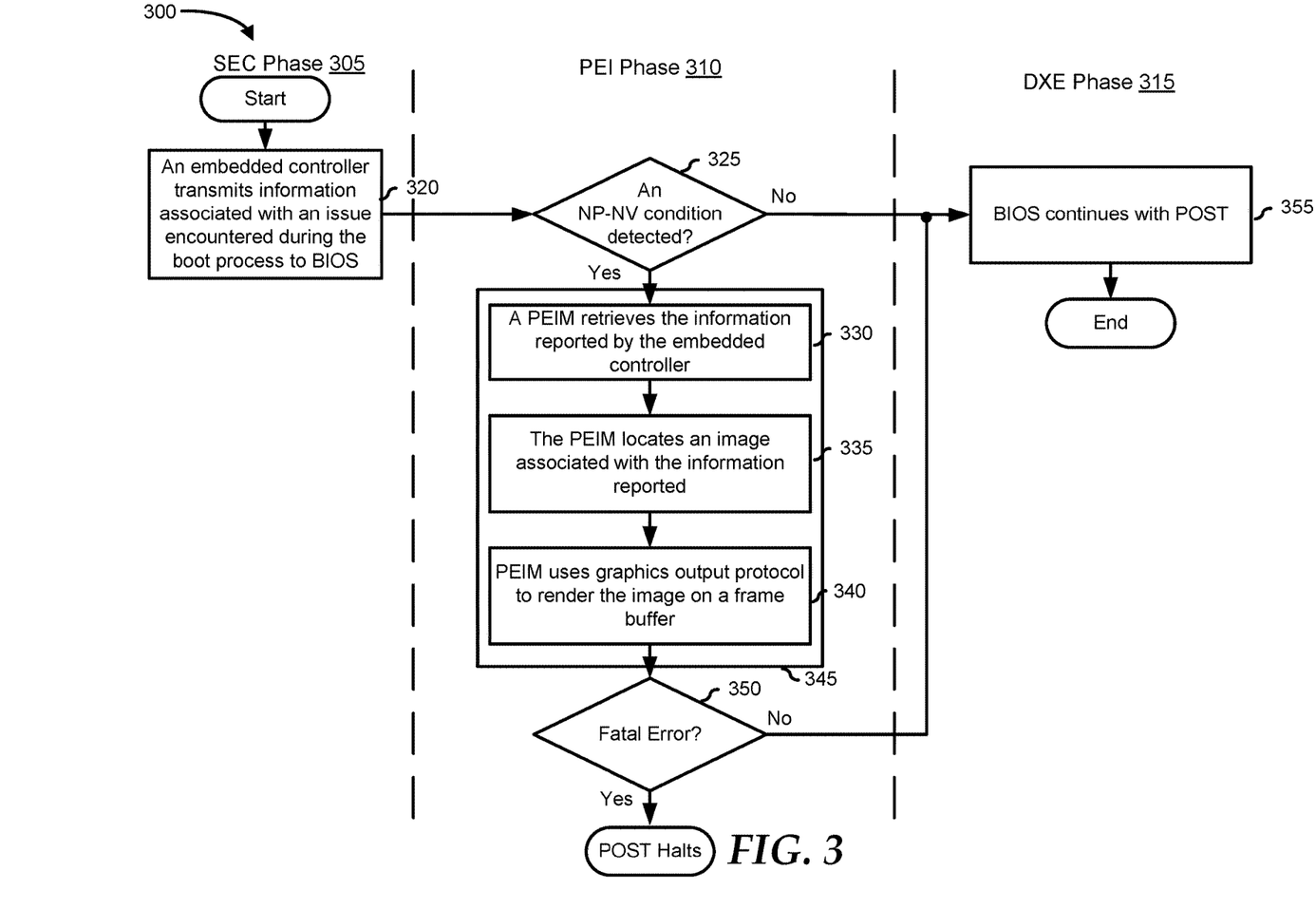
FIG. 3 is a flowchart illustrating an example of a method for enriched pre-extensible firmware interface initialization graphics, according to an embodiment of the present disclosure.

FIG. 3 shows a flow chart of a method 300 for enriched pre-extensible firmware interface initialization graphics. Method 300 may be implemented by one or more components of FIG. 2, such as embedded controller 225, BIOS/EFI 142, PEIM 205, etc. However, while embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 300 is performed during the boot process which can occur at a power-on event, a restart event, or similar. The boot process includes a multi-phase initialization, such as a security (SEC) phase 305, a pre-EFI initialization (PEI) 310 phase, and a driver execution environment (DXE) 315 phase. In one example, PEI phase 310 can include initializing a processor, a memory, a management controller, a chipset. Also, PEI phase 310 is invoked early in the initialization process and used to dispatch PEIMs. The PEIMs may be configured to initialize some permanent memory complements, describe memory in hand-off blocks, and describe the firmware volume locations in the hand-off blocks. A graphics PEIM may be configured to provide PEI to PEI interface (PPI) to the platform code to complete the initialization of the graphics subsystem to enable console output. The graphics PPI interface may also be used by other firmware modules. PEI phase 310 can also include other functions and/or any combination with the aforementioned functions.

At block 320, when an issue is encountered during the SEC phase 305, the embedded controller may transmit information associated with the issue to the BIOS. For example, the embedded controller may transmit one or more error codes, error strings, and/or identifiers of the error. The embedded controller may also transmit other information such as device identifier of a component associated with the issue, the service tag of the information handling system, or similar. Although the issue is shown in this example to be detected during SEC phase 305, the issue may be detected at PEI phase 310. The method proceeds to block 325, where the method determines whether the issue/error code is an NP-NV condition such as a system board, power supply, CPU, graphics card, and/or memory failure. If the NP-NV condition is detected then the "YES" branch is taken and the method proceeds to block 345 which includes blocks 330, 335, and 340 If the NP-NV condition is not detected, then the "NO" branch is taken and the method proceeds to block 355.

At block 330, the PEIM retrieves the information reported by the embedded controller. For example, the PEIM may retrieve the error code, error string, and/or identifier. The method proceeds to block 335, where the PEIM locates an image file that is mapped to the error code, error string, and/or identifier associated with the error. The image file may be stored at a firmware volume of an NV-RAM such as an SPI flash memory device or similar that is accessible by the BIOS and/or the PEIM. The image file may be of various file formats such as bitmap (BMP), joint photographic experts group (JPEG), portable network graphics (PNG), graphics interchange format (GIF), etc. At block 340, the PEIM uses a graphics output protocol to render the image into a frame buffer, wherein each frame buffer is driven out to one or more video output devices such as video display 134. The image may provide the information received from the embedded controller to assist in the triage and/or resolution steps to address the NP-NV condition. For example, the image may provide instructions for system mitigation steps like an auto real-time clock (RTC) reset. The auto RTC reset resets the BIOS to factory default settings and the computer date and time.

The method proceeds to decision block 350 where the PEIM determines whether the NP-NV condition detected is a fatal error. If the NP-NV condition is a fatal error, then the "YES" branch is taken and the boot process stops. If the NP-NV condition is not a fatal error, then the "NO" branch is taken and the method proceeds to block 355 where the BIOS continues with the boot process and may draw an image such as a logo of the OEM of the information handling system on the one or more output devices using the graphics output protocol.

Figure 4:
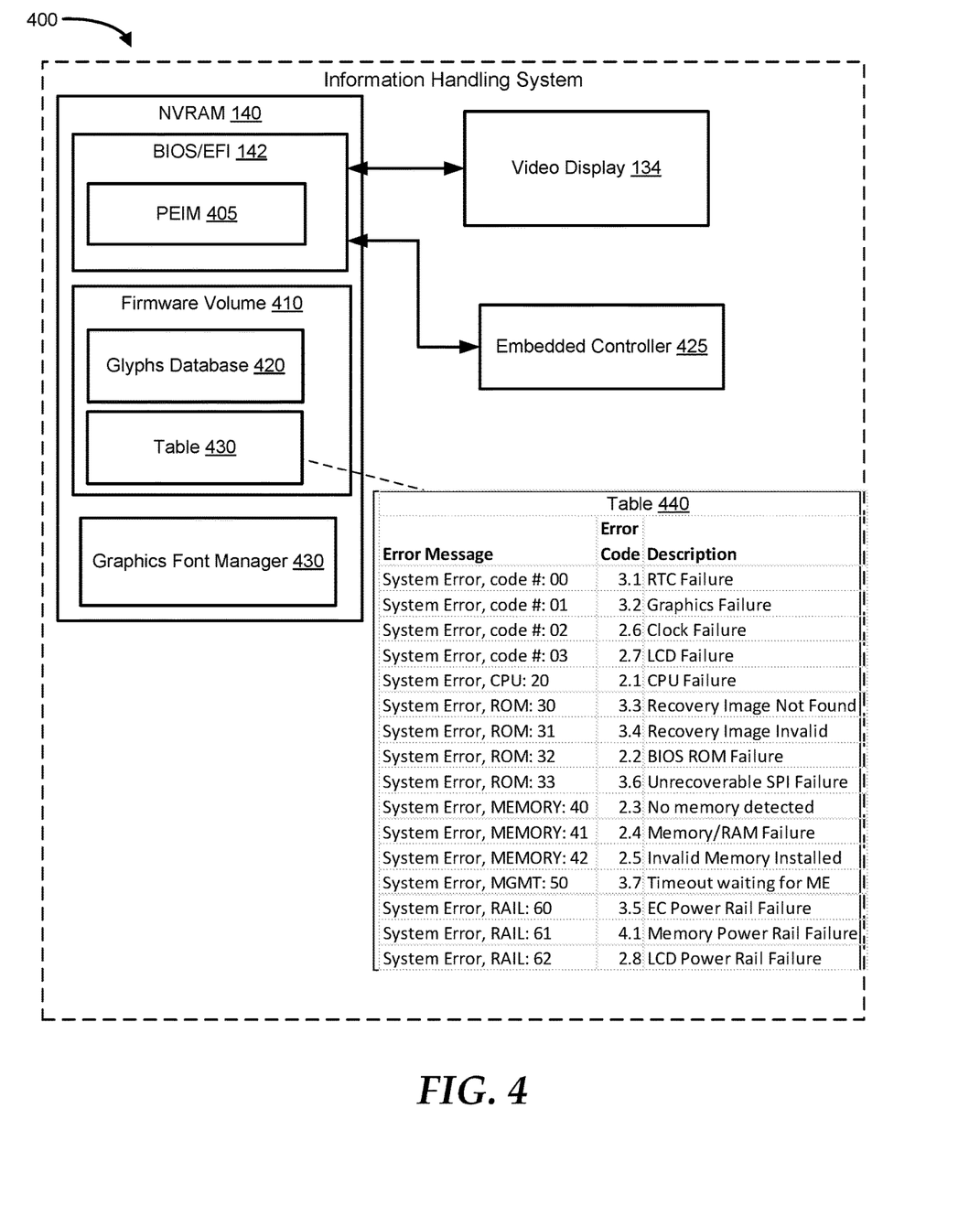
FIG. 4 is a block diagram illustrating an information handling system for enriched pre-extensible firmware interface initialization graphics, according to an embodiment of the present disclosure.

FIG. 4 shows an information handling system 400 for where a system and method for enriched pre-extensible firmware interface initialization graphics. Information handling system 400, which is similar to information handling system 200 of FIG. 2, includes video display 134, NVRAM 140, and an embedded controller 425 which is similar to embedded controller 225 of FIG. 2. NVRAM 140 includes BIOS/EFI 142, a graphics font manager 430, and a firmware volume 410 which is similar to firmware volume 210 of FIG. 2. BIOS/EFI 142 includes a PEIM 405 which is similar to PEIM 205 of FIG. 2.

Firmware volume 410 includes a glyphs database 420. Glyphs database 420 may include a plurality of font glyphs that corresponds to various characters. Firmware volume 410 may be located in an SPI partition or an EFI system partition. Although, graphics font manager 430 may be configured to process font files and generate glyphs database 420. Graphics font manager 430 may use glyphs database 420 in managing a set of the font glyphs. One of skill in the art may use other means instead of a database such as a collection of files or similar that may be used to retrieve, store, and utilize the font glyphs.

When information handling system 400 is in an NP-NV condition or recovery state with the NP-NV condition, embedded controller 425 may send information associated with the NP-NV condition to BIOS/EFI 142 and/or PEIM 405. For example, embedded controller 225 may send an error code, error string, or identifier associated with the error code or error string. For example, PEIM 405 may use table 440 to determine an error string/message and description associated with the error code. Table 440 may be stored in NVRAM 140 and includes mapping of error messages and/or descriptions to error codes. PEIM 405 may be configured to render each character in the error message and/or description using the font glyphs from the glyphs database 420. PEIM 405 may also render other information associated with the error code such as the service tag of the device or component of the information handling system affected by the error code. PEIM 404 may also render a set of strings associated with a mitigation or recovery of the information handling system 400 from an NP-NV condition. PEIM 405 may dynamically transmit each string or a set of strings to a frame buffer for display in video display 134 via graphics output protocol.

Those of ordinary skill in the art will appreciate that the configuration, hardware, and/or software components of information handling system 200 depicted in FIG. 2 and information handling system 400 of FIG. 4 may vary. For example, the illustrative components within information handling systems 200 and 400 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 5:
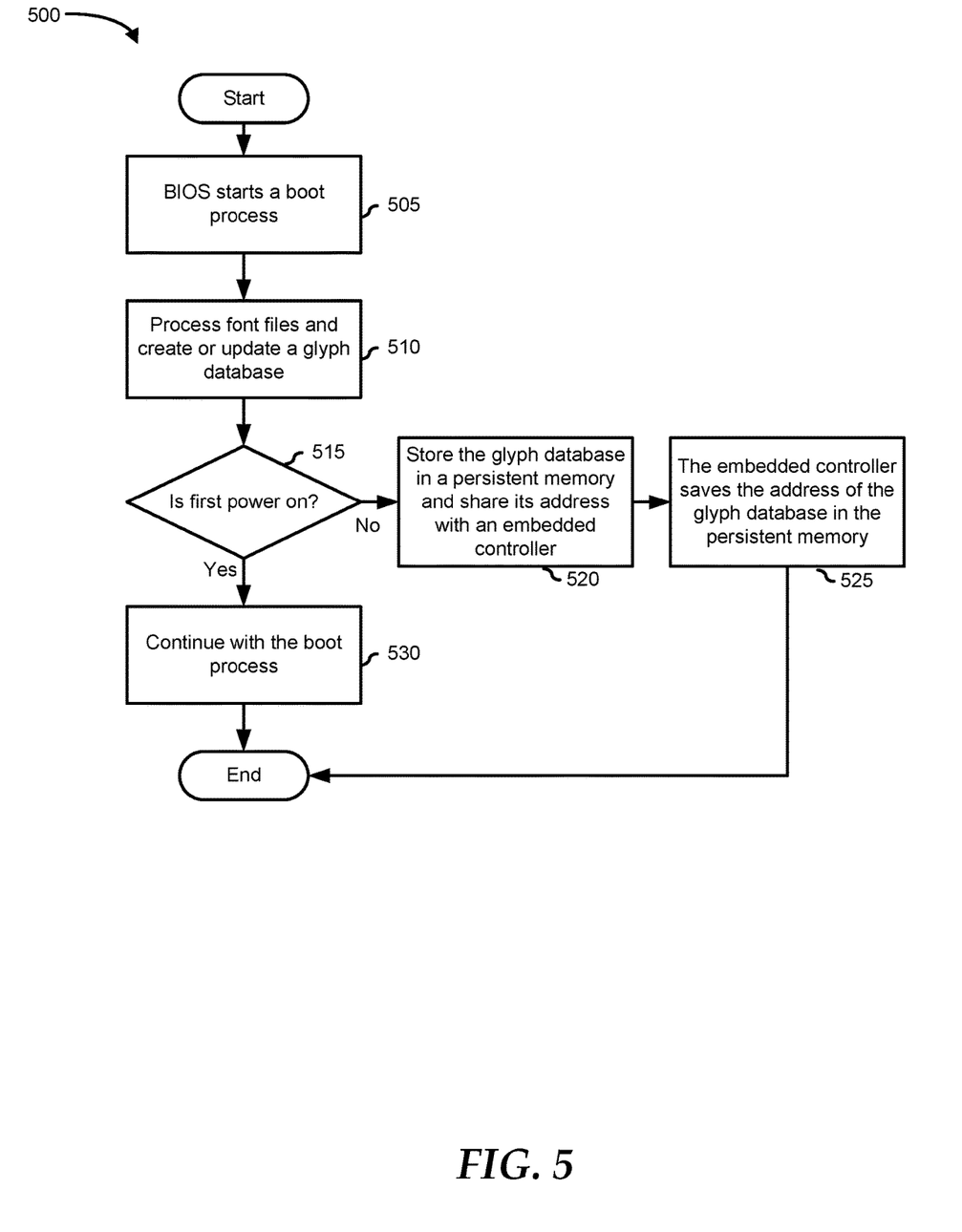
FIG. 5 is a flowchart illustrating an example of a method for generating and storing a glyphs database that is accessible to an embedded controller, according to an embodiment of the present disclosure.

FIG. 5 shows a flowchart of a method 500 for generating and storing a glyphs database that is accessible to an embedded controller. Method 500 may be implemented by one or more components of FIG. 4, such as embedded controller 425, BIOS/EFI 142, PEIM 405, etc. However, while embodiments of the present disclosure are described in terms of information handling system 400 of FIG. 4, it should be recognized that other systems may be utilized to perform the described method. One of skill in the art will appreciate that this flowchart explains a typical example, which can be extended to advanced applications or services in practice.

At block 505, BIOS starts the boot process. The method proceeds to block 510 where the graphics font manager is configured to process font files and generate and/or update a glyphs database at the DXE phase. A glyph is a visual representation of a piece of data. For example, the glyph may be a bitmap of a font, such as a font glyph. Accordingly, the glyphs database includes bitmaps for various fonts. The glyphs database is stored in a non-volatile storage that is accessible by the BIOS, embedded controller, and/or PEIM at the PEI phase. For example, the glyphs database is stored in an SPI flash memory device. Location of the glyphs database may be provided to the embedded controller and/or the BIOS.

At decision block 515, the method determines if this is the first time the information handling system is powered on. If this is the first time the information handling system is powered-on then the "YES" branch is taken and the method proceeds to block 530. If this is not the first time the information handling system is powered-on then the "NO" branch is taken and the method proceeds to block 520.

At block 530, the BIOS continues with the boot process and creates a glyphs database. At block 520, the BIOS stores the glyphs database into a persistent memory such as NVRAM 142 and shares its address with the embedded controller. The method proceeds to block 525 where the embedded controller saves the address of the glyphs database in the persistent memory. The embedded controller may also be given access to the glyphs database during a PEI phase and/or upon running into an NP-NV condition/scenario.

Figure 6:
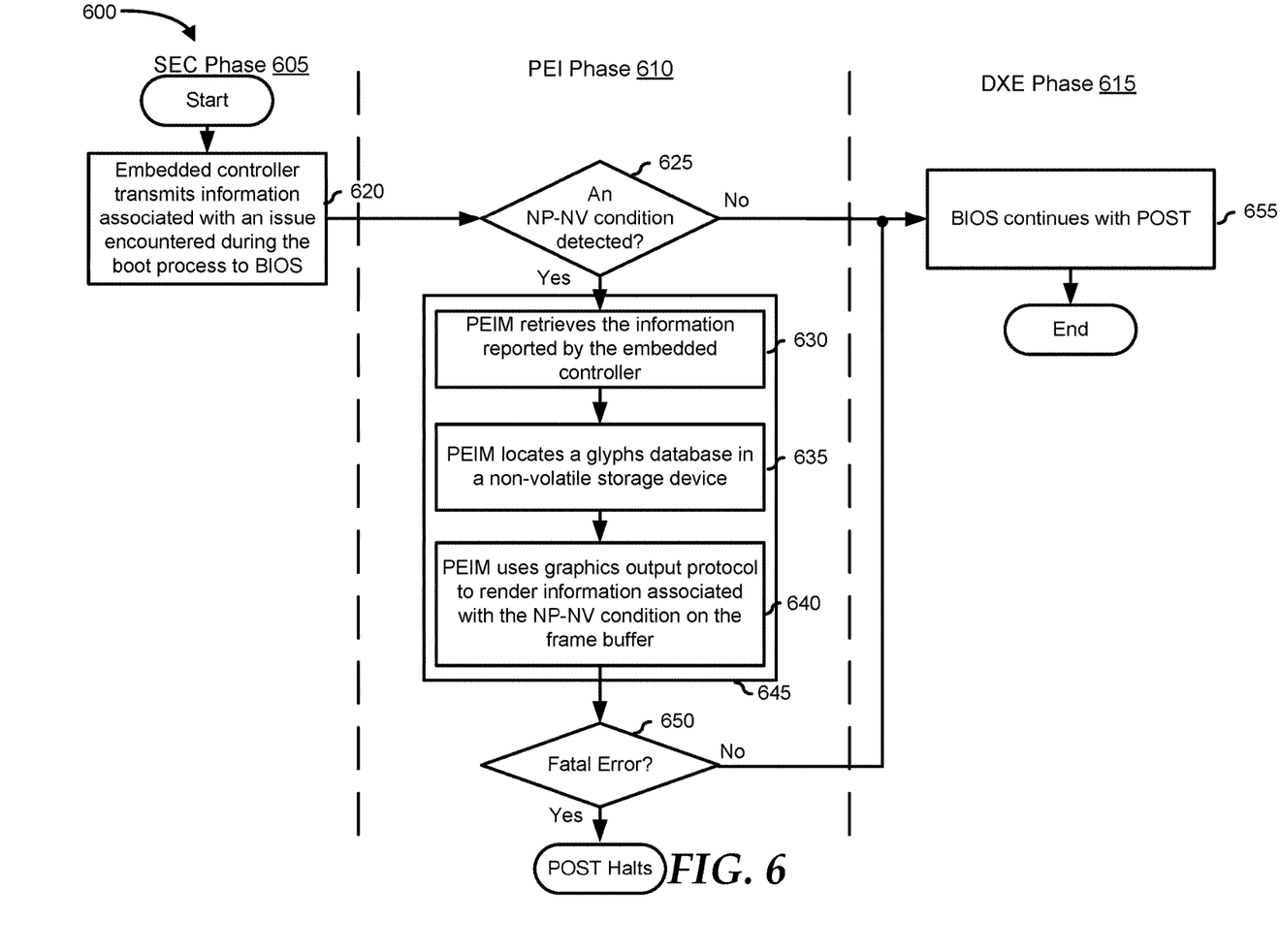
FIG. 6 is a flowchart illustrating an example of a method for enriched pre-extensible firmware interface initialization graphics, according to an embodiment of the present disclosure.

FIG. 6 shows a flowchart of a method 600 for enriched pre-extensible firmware interface initialization graphics. Method 600 may be implemented by one or more components of FIG. 4, such as BIOS/EFI 142, PEIM 405, embedded controller 425, graphics font manager 430, etc. However, while embodiments of the present disclosure are described in terms of information handling system 400 of FIG. 4, it should be recognized that other systems may be utilized to perform the described method. One of skill in the art will appreciate that this flowchart explains a typical example, which can be extended to advanced applications or services in practice.

Method 600 may be performed during the boot process which can occur at a power-on event, a restart event, or similar. The boot process includes a multi-phase initialization, such as an SEC phase 605, a PEI phase 610, and a DXE phase 615 similar to method 300 of FIG. 3. At block 620, when an issue is encountered during the SEC phase 605, the embedded controller transmits information associated with the issue to the BIOS and/or a PEIM. The embedded controller may also transmit the location of the glyphs database to the BIOS and/or the PEIM. The method proceeds to block 625, where the method determines whether the issue is an NP-NV condition, such as a system board, power supply, CPU, graphics card, and memory failure. If the NP-NV condition is detected then the "YES" branch is taken and the method proceeds to block 645 which includes blocks 630, 635, and 640 If the NP-NV condition is not detected, then the "NO" branch is taken and the method proceeds to block 655.

At block 630, the PEIM retrieves the information received from the embedded controller, such as the error code, error string, and/or identifier. The method proceeds to block 635, where the PEIM locates a glyphs database stored in a non-volatile storage device. The glyphs may be of various file formats such as bitmap (BMP), joint photographic experts group (JPEG), PNG, GIF, etc. At block 640, the PEIM converts strings associated with the information or a portion thereof to font glyphs using the glyphs database. The glyphs are then transmitted to the frame buffer to be rendered at the display device using a graphics output protocol, wherein information included in the image may be used during a system triage and/or recovery of the NP-NV scenario.

The method proceeds to decision block 650 where the PEIM determines whether the NP-NV condition detected is a fatal error. If the NP-NV condition is a fatal error, then the "YES" branch is taken and the boot process stops. If the NP-NV condition is not a fatal error, then the "NO" branch is taken and the method proceeds to block 655 where the BIOS continues with the boot process and may draw an image such as a logo of the OEM of the information handling system on the one or more output devices using the graphics output protocol.

Although FIG. 3, FIG. 5, and FIG. 6 show example blocks of method 300, method 500, and method 600 in some implementation, method 300, method 600, and method 600 may include additional blocks, fewer blocks, different blocks, or differently arranged blocks than those depicted in FIG. 3, FIG. 5, and FIG. 6. Those skilled in the art will understand that the principles presented herein may be implemented in any suitably arranged processing system. Additionally, or alternatively, two or more of the blocks of method 300, method 500, and method 600 may be performed in parallel. For example, blocks 520 and 525 of method 500 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
generating, by a processor, a glyphs database during a boot process;
storing the glyphs database in a non-volatile storage device, wherein the glyphs database includes a plurality of font glyphs;
in response to determining that a no power-on self-test (POST), no video condition is encountered during the boot process, transmitting by an embedded controller an error code associated with the no POST, no video condition to a basic input/output system;
retrieving information associated with the error code from the glyphs database; and
rendering, by the basic input/output system, the information in a display device using the font glyphs in the glyphs database.

2. The method of claim 1, wherein the rendering is performed using a graphics output protocol.

3. The method of claim 1, wherein the glyphs database is accessible to the embedded controller during the boot process.

4. The method of claim 1, wherein the embedded controller saves an address of the glyphs database in the non-volatile storage device.

5. The method of claim 1, wherein the generating of the glyphs database is performed during a driver execution environment phase.

6. The method of claim 1, in response to determining that the no POST, no video condition is a fatal error, halting the boot process.

7. The method of claim 1, in response to determining that the no POST, no video condition is not a fatal error, continuing with the boot process.

8. An information handling system, comprising:
an embedded controller configured to transmit an error code to a basic input/output system; and
a processor configured to generate a glyphs database during a boot process of the information handling system and to store the glyphs database in a non-volatile storage device, wherein the glyphs database includes a plurality of font glyphs;
the basic input/output system configured to:
retrieve information associated with the error code transmitted by the embedded controller;
in response to a determination that the error code is associated with a no power-on self-test, no video condition, locate the glyphs database from the non-volatile storage device; and
render the information using the font glyphs in the glyphs database.

9. The information handling system of claim 8, wherein the basic input/output system renders the information using a graphics output protocol.

10. The information handling system of claim 8, wherein the glyphs database is accessible to the embedded controller during the boot process of the information handling system.

11. The information handling system of claim 8, wherein the glyphs database is stored in an extensible firmware interface system partition.

12. The information handling system of claim 8, wherein the embedded controller saves an address of the glyphs database in the non-volatile storage device.

13. The information handling system of claim 8, wherein the processor generates the glyphs database during a driver execution environment phase of the boot process.

14. A non-transitory computer-readable media to store instructions that are executable to perform operations comprising:
generating a glyphs database during a boot process:
storing the glyphs database in a non-volatile storage device, wherein the glyphs database includes a plurality of font glyphs;
in response to determining that an issue that is a no power-on self-test (POST), no video condition is encountered during the boot process, transmitting an error code associated with the no POST, no video condition to a basic input/output system;
retrieving an image associated with the error code from the glyphs database; and
rendering the image associated with the issue using the font glyphs in the glyphs database.

15. The non-transitory computer-readable media of claim 14, wherein the image is associated with a firmware file globally unique identifier.

16. The non-transitory computer-readable media of claim 14, wherein the font glyphs are bitmaps of fonts.

17. The non-transitory computer-readable media of claim 14, further comprising in response to determining that the no POST, no video condition is a fatal error, halting the boot process.

18. The non-transitory computer-readable media of claim 14, wherein the image includes mitigation steps for the no POST, no video condition.

19. The non-transitory computer-readable media of claim 14, wherein the rendering of the image is performed using a graphics output protocol.

20. The non-transitory computer-readable media of claim 14, wherein the retrieving of the error code is performed during a pre-extensible firmware interface initialization phase of the boot process.

* * * * *